United States Patent
Campbell et al.

(10) Patent No.: US 7,240,596 B1
(45) Date of Patent: Jul. 10, 2007

(54) WORKBENCH HOLDER SYSTEM

(76) Inventors: Stuart M. Campbell, RR1, Site 2A, Box O, Port Elgin, Ontario (CA) N0H 2C5; Jacqueline M. Campbell, RR1, Site 2A, Box O, Port Elgin, Ontario (CA) N0H 2C5

( * ) Notice: Subject to any disclaimer, the term of this patent is extended or adjusted under 35 U.S.C. 154(b) by 407 days.

(21) Appl. No.: 10/774,738

(22) Filed: Feb. 9, 2004

Related U.S. Application Data (63) Continuation-in-part of application No. 09/933,550, filed on Aug. 20, 2001, now Pat. No. 6,688,208, which is a continuation-in-part of application No. 09/356,653, filed on Jul. 19, 1999, now abandoned.

(51) Int. Cl.
*B27B 11/00* (2006.01)

(52) U.S. Cl. .............. 83/743; 83/745; 83/829

(58) Field of Classification Search ............. 83/743, 83/745, 829, 435.12, 435.13, 435.14; 33/495–500, 33/640, 630

See application file for complete search history.

(56) References Cited

U.S. PATENT DOCUMENTS 2,773,523 A * 12/1956 Lloyd .................... 83/745
3,913,440 A * 10/1975 Baker .................... 83/745
4,202,233 A *  5/1980 Larson ................... 83/745
4,306,479 A * 12/1981 Eberhardt ................ 83/745
4,598,482 A *  7/1986 Castleton ................ 33/482
4,608,898 A *  9/1986 Volk .................... 83/745
4,843,728 A *  7/1989 Francis .................. 33/640
5,148,730 A *  9/1992 McCaw .................. 83/745
5,182,975 A *  2/1993 Warner .................. 83/745
5,385,183 A *  1/1995 Ferranti ............... 144/144.51
5,472,029 A * 12/1995 Ketch .................. 144/371

* cited by examiner

*Primary Examiner*—Boyer D. Ashley
*Assistant Examiner*—Omar Flores Sánchez
(74) *Attorney, Agent, or Firm*—Edward P. Dutkiewicz (57) ABSTRACT

A workbench holder system comprising a stop piece having a height and a thickness and a length in a generally rectilinear configuration with a first end having a first angled cut and with a second end having a second angled cut, one cut being at an obtuse angle and the other cut being at an acute angle. The system also comprises a cutting guide and a support bracket each coupled to the stop piece, the cutting guide and support bracket each having an upper horizontal component and a downwardly extending vertical component with a slot formed in the horizontal component of the cutting guide extending away from the stop piece and with apertures formed in the vertical components for coupling to the stop piece.

1 Claim, 7 Drawing Sheets

WORKBENCH HOLDER SYSTEM

RELATED APPLICATION

The present application is a continuation-in-part of co-pending application Ser. No. 09/933,550 filed Aug. 20, 2001 now U.S. Pat. No. 6,688,208 entitled Workbench Holder System which is in turn a continuation-in-part of now abandoned Ser. No. 09/356,653 filed Jul. 19, 1999, entitled Workbench Holder System.

BACKGROUND OF THE INVENTION

1. Field of the Invention

The present invention relates to a new and improved workbench holder system and, more particularly, pertains to a workbench holder system for the cross cut of lumber with an electric hand circular saw and portable workbench.

2. Description of the Prior Art

The use of workbench systems of known designs and configurations is known in the prior art. More specifically, workbench systems of known designs and configurations heretofore devised and utilized for the purpose of facilitating accurate crosscuts in lumber are known to consist basically of familiar, expected, and obvious structural configurations, notwithstanding the myriad of designs encompassed by the crowded prior art which has been developed for the fulfillment of countless objectives and requirements.

The prior art discloses a large number of workbench systems of known designs and configurations. By way of example, U.S. Pat. No. 2,773,523 to Hopla, issued Dec. 11, 1956, discloses a guide device for portable power saws. U.S. Pat. No. 4,056,028 to Patterson, issued Nov. 1, 1977, discloses an apparatus for guiding a portable power saw. U.S. Pat. No. 4,306,479 to Eberhardt, issued Dec. 22, 1981, discloses a portable power driven cutting tool guide. International Publication Number WO 91/01838, published 21 Feb., 1991 to Kirbach et al., discloses a self aligning guide system for one or more circular saw blades. U.S. Pat. No. 5,182,975 to Warner, issued Feb. 2, 1993, discloses a guide for portable power saw. Lastly, U.S. Design Pat. No. 387,782 to Letendre, issued Dec. 16, 1997, discloses a guide assembly for conventional bench saw.

In this respect, the workbench holder system according to the present invention substantially departs from the conventional concepts and designs of the prior art, and in doing so provides an apparatus primarily developed for the purpose of a workbench holder system for the cross cuts of lumber with an electric hand circular saw and portable workbench.

Therefore, it can be appreciated that there exists a continuing need for a new and improved workbench holder system which can be used for a workbench holder system for the cross cuts of lumber with an electric hand circular saw and portable workbench. In this regard, the present invention substantially fulfills this need.

SUMMARY OF THE INVENTION

In view of the foregoing disadvantages inherent in the known types of workbench systems of known designs and configurations now present in the prior art, the present invention provides a new and improved workbench holder system. As such, the general purpose of the present invention, which will be described subsequently in greater detail, is to provide a new and improved workbench holder system and methods which have all the advantages of the prior art and none of the disadvantages.

To attain this, the present invention essentially comprises a new and improved workbench holder system for the cross cuts of lumber with an electric hand circular saw and portable workbench. The system has, as its first component, a stop piece having a height and a thickness and a length in a generally rectilinear configuration with a first end having a first angled cut at an obtuse angle and with a second end having a second angled cut at an acute angle. Next provided is a cutting guide and a support bracket each having an inverted L-shaped configuration and each having an elongated horizontal component with an upper surface and a lower surface and a downwardly extending vertical component. The cutting guide has a slot through the horizontal component and a plurality of apertures through the vertical component with a plurality of screws coupling the cutting guide to the stop piece and with the lower surface of the horizontal component in contact with the upper surface of the stop piece and the cutting guide spaced a short distance from the first end thereof.

The support bracket is in an inverted L-shaped configuration having an elongated horizontal component with an upper surface and a lower surface and of a length shorter than the horizontal component of the cutting guide and a downwardly extending vertical component. The support bracket has an aperture through the vertical component thereof with a screw coupling the support bracket to the stop piece with the lower surface of the horizontal component in contact with the upper surface of the stop piece and the support bracket spaced a short distance from the second end thereof.

The stop piece and the vertical components of the cutting guide and support bracket all have downwardly extending portions adapted to be secured in a portable workbench vise whereby a generally rectilinear piece of lumber may be brought into contact with the stop piece remote from the vertical components of the cutting guide and the support bracket and beneath the lower surfaces of the horizontal components of the cutting guide and the support bracket for the accurate cross cutting and angle cutting of lumber.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved workbench holder system which has all the advantages of the prior art workbench systems of known designs and configurations and none of the disadvantages.

It is another object of the present invention to provide a new and improved workbench holder system which may be easily and efficiently manufactured and marketed. It is a further object of the present invention to provide a new and improved workbench holder system which is of a durable and reliable construction.

An even further object of the present invention is to provide a new and improved workbench holder system which is susceptible of a low cost of manufacture with regard to both materials and labor, and which accordingly is then susceptible of low prices of sale to the consuming public, thereby making such a workbench holder system economically available to the buying public.

Even still another object of the present invention is to provide a workbench holder system for the cross cuts of lumber with an electric hand circular saw and portable workbench.

Lastly, it is an object of the present invention to provide a workbench holder system which comprises a stop piece in a generally rectilinear configuration having a height and a thickness and a length in a generally rectilinear configuration with a first end having a first angled cut and with a second end having a second angled cut, one cut being at an obtuse angle and the other cut being at an acute angle. The system also comprises a cutting guide and a support bracket each coupled to the stop piece, the cutting guide and support bracket each having an upper horizontal component and a downwardly extending vertical component with a slot formed in the horizontal component of the cutting guide extending away from the stop piece and with apertures formed in the vertical components for coupling to the stop piece.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

With reference now to the drawings, and in particular to FIGS. 1 through 7 thereof, the preferred embodiment of the new and improved workbench holder system embodying the principles and concepts of the present invention and generally designated by the reference numeral 10 will be described.

The present invention, the new and improved workbench holder system 10, is comprised of a plurality of components. Such components, in their broadest context, include a stop piece and a cutting guide. Each of the individual components is specifically configured and correlated one with respect to the other so as to attain the desired objectives.

The first component of the present invention is a stop piece 14. The stop piece has a height and a thickness and a length in a generally rectilinear configuration. It is also provided with a triangular notch 16 in the corner.

The next component of the system is a cutting guide 20. The cutting guide 20 is formed in an inverted L-shaped configuration. The guide has an elongated upper horizontal component 22 and a downwardly extending vertical component 24. The cutting guide also has a plurality of apertures 26, 28. The apertures are formed through the vertical component and horizontal component thereof. A plurality of screws 30, 32 couples the cutting guide to the stop piece. This arrangement also provides for attachment to a template with the lower surface of the horizontal component in contact with the upper surface of the stop piece adjacent to a first end thereof.

A support bracket 36 is next provided. The support bracket is formed in an inverted L-shaped configuration. The support bracket has an elongated horizontal component 38 shorter than the first horizontal component and a downwardly extending vertical component 40. Also provided is an aperture 42 in the support bracket through the vertical component thereof. A screw 44 couples the support bracket to the stop piece with the lower surface of the horizontal component in contact with the upper surface of the stop piece adjacent to a second end thereof.

The vertical components of the stop piece, cutting guide and support bracket each have lower extents 48, 50 for being secured in a portable workbench vise. In this manner, a generally rectilinear piece of lumber may be brought in contact with the surface of the stop piece remote from the vertical component of the cutting guides and the lower surface of the horizontal component for the accurate cutting of the lumber.

Figure 1:
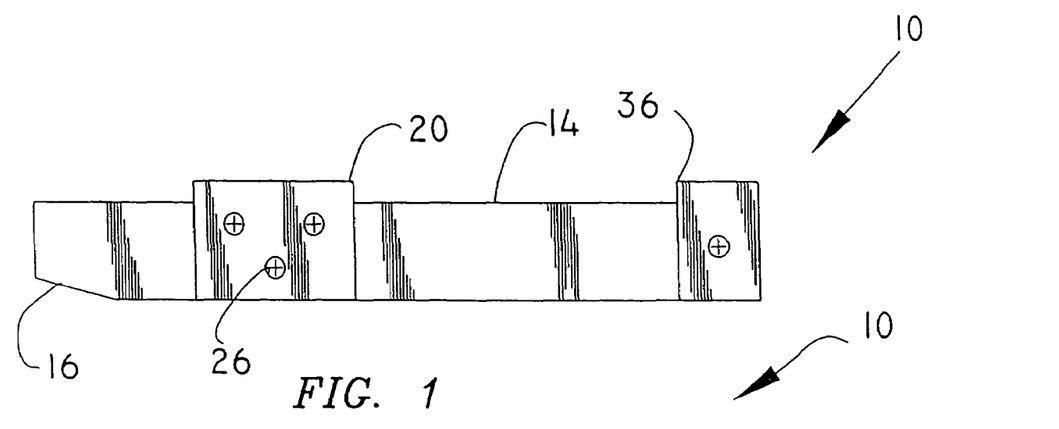
FIG. 1 is a side elevational view of the new and improved workbench holder system constructed in accordance with the principle of the present invention.
Figure 2:
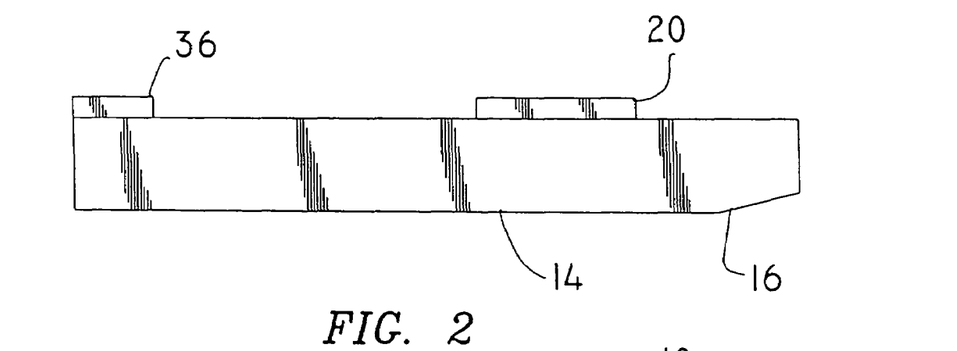
FIG. 2 is a side elevational view of the device shown in FIG. 1 taken from the opposite side thereof.
Figure 3:
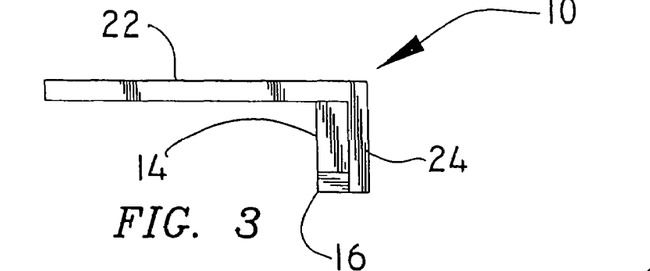
FIG. 3 is a front end elevational view of the device shown in the prior figures.
Figure 4:
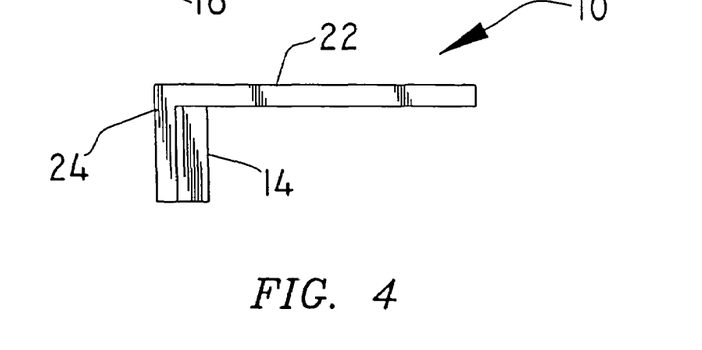
FIG. 4 is an end elevational view of the device shown in the prior figures.
Figure 5:
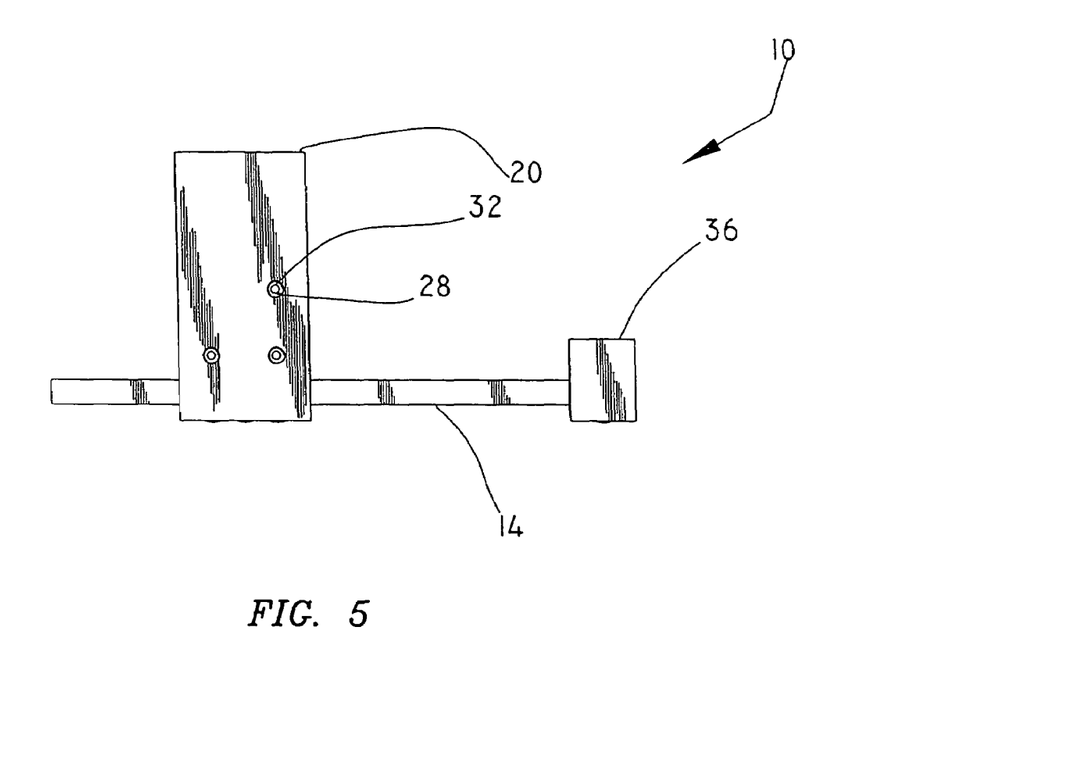
FIG. 5 is a top elevational view of the device shown in the prior figures.
Figure 6:
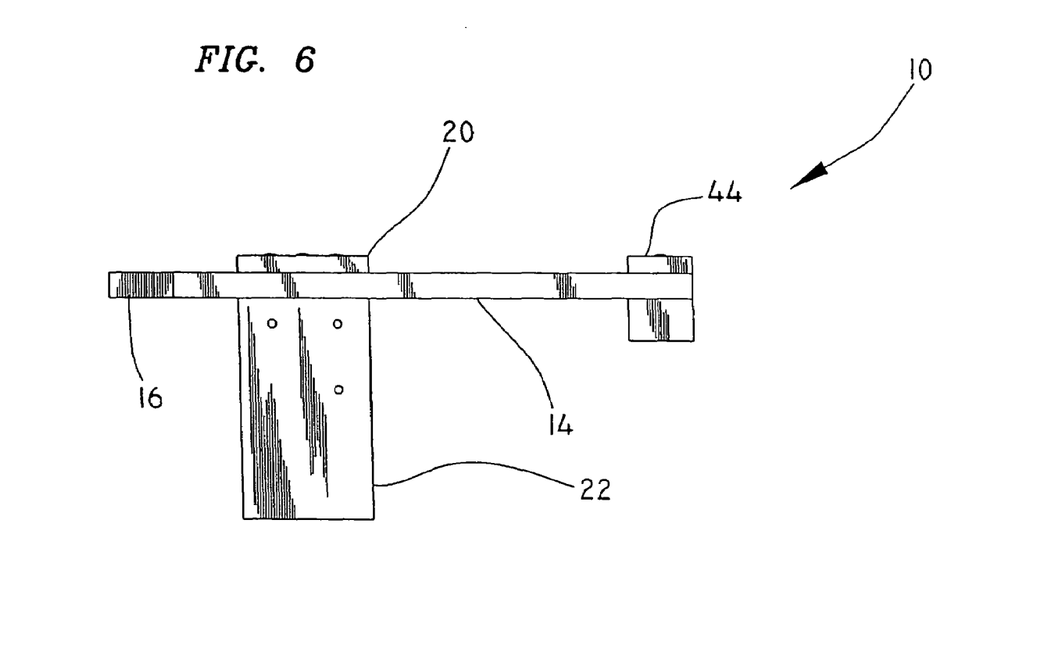
FIG. 6 is a bottom elevational view of the device shown in the prior figures.
Figure 7:
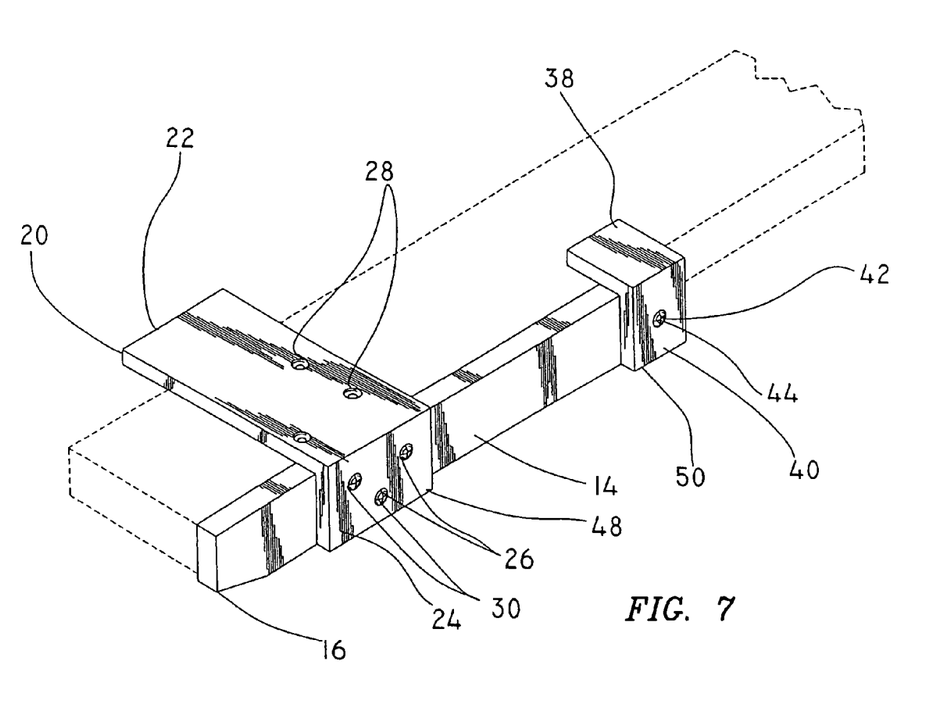
FIG. 7 is a perspective illustration of the device shown in the prior figures.

As can be understood with particular reference to FIG. 7, the stop piece, cutting guide and support bracket have a larger vertical dimension than the lumber being cut. Thus, the lower portion of these components is secured in the vise, so that the workbench holder rests snugly over the lumber. If "thinner" lumber is being cut, the workbench holder sits lower in the vise. This feature of the invention is unique, and avoids the complexities and safety hazards of the prior art.

It is also possible to use the present invention in association with templates such as those made by the user for miter, bevel or compound (a combination of miter and bevel) cuts. This extends the utility of the invention. Consider, for example, the use of a triangular block located beneath the interior region of the cutting guide with one linear edge in flush contact with the stop piece. An opposite linear edge could function as a guide surface for positioning a piece of lumber there against for being cut at an angle from its axis by a saw being guiding by the edge of a cutting guide.

The system of the present invention is a cutting guide for use with an electric hand circular saw and portable workbench which facilitates quick and easy accurate crosscuts in lumber, square and to length.

The system consists of a stop piece, a cutting guide and a support bracket. The preferred embodiment might employ a cutting guide and support bracket made of molded plastic, cast metal, or formed sheet metal. The stop piece incorporates a cut line indicator, vertical first end of the stop piece, which shows the user where to position the cutting mark on the lumber for an accurate cut. When the system is used for the first time, the user trims the stop piece with the saw to form the cut line indicator for all future cutting with that saw. This feature adds to the convenience, speed and accuracy of cutting lumber using the present system.

The system secures the lumber in addition to guiding the circular saw, providing a safety advantage over conventional methods of cutting lumber at a job site. It is placed over the lumber with the stop piece secured in the portable workbench vise. The lumber is positioned against the stop piece with the cutting mark at the cut line indicator, thus holding it securely while the circular saw is run along the cutting guide edge. Lumber of the same thickness can be repeatedly positioned under the cutting guide, cut to length, and removed, without adjusting the system within the workbench vise.

Without the use of the system of the present invention, considerable skill and patience is required to make accurate, square crosscuts. The use of the system of the present invention saves materials by eliminated skewed cuts, thus saving time and money.

An alternate embodiment of the invention is shown in FIGS. 8-11. This improvement avoids the need to pre-cut a template and secure it under the cutting guide to position the workpiece for miter cuts. The improvement has the further advantage of being infinitely adjustable within the capacity of the workbench holder system.

One of the three screw holes 28 is removed from the horizontal portion of the cutting guide. This hole is no longer necessary, as the template formerly used for cutting miters is not required. The remaining two screw holes 110 are left available to secure a temporary block against the stop piece for any special operations that the user desires.

A slot 112 in the cutting guide allows a button 114 to be secured under the cutting guide by a screw 116 at any position along the length of the slot. The button is approximately 1 inch in diameter by 0.25 inch deep, and has an internal screw thread. When the button is not in use for cutting miters, it is stored in a recess 118 in the stop piece. The dimensions of the recess match those of the button. A plain hole in the center of the recess extends through the remaining thickness of the stop piece so that the screw 116 can be inserted from the opposite side of the stop piece to secure the button in the recess.

When the user wants to cut a miter, the workpiece is positioned under the cutting guide at the desired angle, with the edge of the workpiece touching the corner 120 of the stop piece. The button is then secured under the slot so that it touches one edge of the workpiece. This arrangement allows the user to repeatedly position and cut workpieces at the same angle.

The workbench holder system can also be used for bevel and compound cuts, a combination of miter and bevel cuts. In this case, the edge 128 of the stop piece, instead of being vertical as shown in the sketch, is cut at an angle to the vertical that matches the desired bevel angle. This alternative arrangement is shown by a dashed line. Once the stop piece is cut in this manner, the workbench holder system may be used for "square" bevel cuts (without using the button), or compound cuts (with the button in use).

The final embodiment of the invention is illustrated in FIGS. 14 through 17. It is a system 132 which is clever new way to cut lumber accurately and safely with a portable circular saw. The components are a support bracket, stop piece, button, cutting guide and cut line indicator. More specifically, the invention is a workbench holder system 132 for the cross cuts of lumber with an electric hand circular saw and portable workbench. This embodiment comprises, in combination, a stop piece 136 having a height and a thickness and a length in a generally rectilinear configuration with a first end 138 having a first angled cut 140 at an obtuse angle and with a second end 142 having a second angled cut 144 at an acute angle.

Next provided is a cutting guide 148 and a support bracket 150 each having an inverted L-shaped configuration and each having an elongated horizontal component with an upper surface and a lower surface and a downwardly extending vertical component. The cutting guide 148 has a slot through the horizontal component and a plurality of apertures through the vertical component with a plurality of screws coupling the cutting guide to the stop piece and with the lower surface of the horizontal component in contact with the upper surface of the stop piece. The cutting guide is spaced a short distance from the first end thereof in the configuration of FIGS. 14 and 15.

Figure 14:
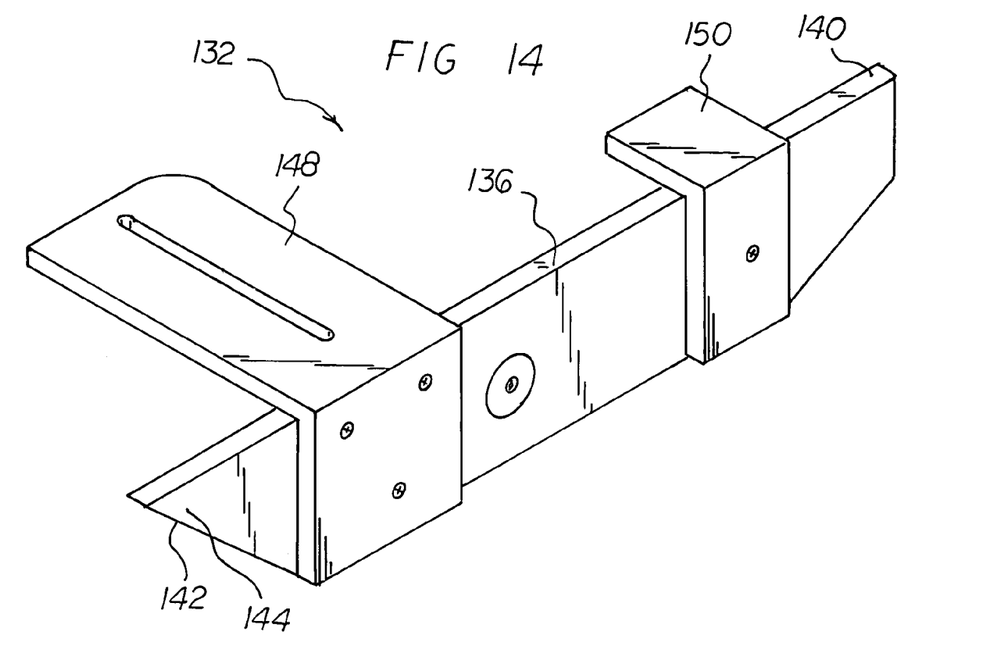
FIG. 14 is a perspective illustration of the final alternate embodiment of the invention shown in FIG. 12 but in another configuration.
Figure 15:
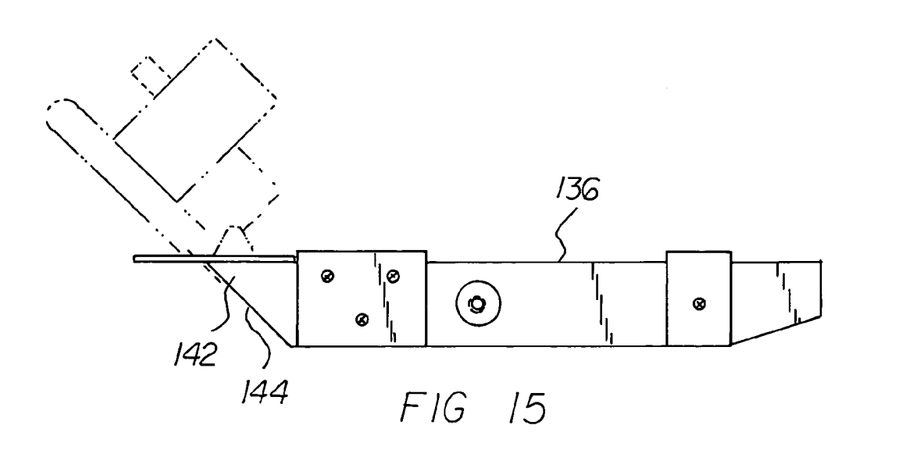
FIG. 15 is a front elevational view of the embodiment shown in the FIG. 14 configuration.

The support bracket 150 is in an inverted L-shaped configuration and has an elongated horizontal component with an upper surface and a lower surface and of a length shorter than the horizontal component of the cutting guide and a downwardly extending vertical component. The support bracket has an aperture through the vertical component thereof with a screw coupling the support bracket to the stop piece with the lower surface of the horizontal component in contact with the upper surface of the stop piece. The support bracket is spaced a short distance from the second end thereof.

The stop piece and the vertical components of the cutting guide and support bracket all having downwardly extending portions adapted to be secured in a portable workbench vise whereby a generally rectilinear piece of lumber may be brought into contact with the stop piece remote from the vertical components of the cutting guide and the support bracket and beneath the lower surfaces of the horizontal components of the cutting guide and the support bracket for the accurate cross cutting and angle cutting of lumber.

The configuration of FIGS. 14 and 15 is similar to the configuration of 12 and 13 except that the cutting guide is spaced a short distance from the second end thereof rather than the first end and the support bracket is spaced a short distance from the first end rather than the second end. This is for miter cutting and compound cutting of lumber. The other components of this embodiment are essentially the same as in the prior embodiments.

Figure 13:
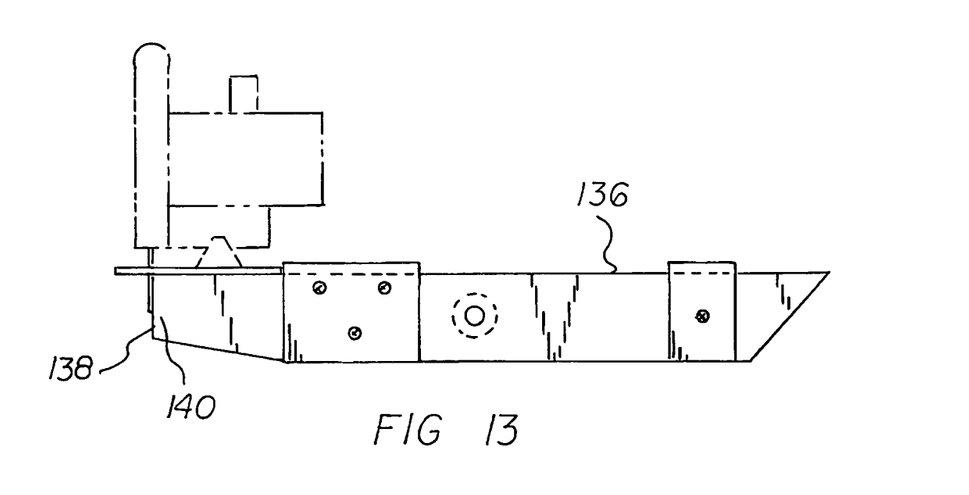
FIG. 13 is a front elevational view of the embodiment shown in FIG. 12.

The stop piece is the backbone of the system. The stop piece is preferably made from hardwood, which is durable but will not damage the saw blade. The stop piece aligns the lumber and provides support right up to the cutting line, preventing the lumber from slipping away from you as the cut is made. One end of the stop piece is cut square, forming a cut line indicator used for cross cuts and miter cuts as shown in FIG. 13. The other end is cut at a 45 degree angle, forming a cut line indicator used for bevel and compound cuts as shown in FIG. 15. Using the cut line indicator to position the lumber pieces can be easily cut to within 1/32" of the required length. If a piece is cut fractionally too long, a small shaving can be taken off to make it fit exactly.

The support bracket and cutting guide align the system with the lumber when setting up in the workbench vise and they prevent long pieces of lumber from tipping to either side. The support bracket and cutting guide would be made from steel stampings for high volume production. But other materials that are strong and rigid could be considered, e.g. allow die castings or high-strength plastic moldings. The circular saw slides against one edge of the cutting guide, providing an accurate square cut every time.

Figure 8:
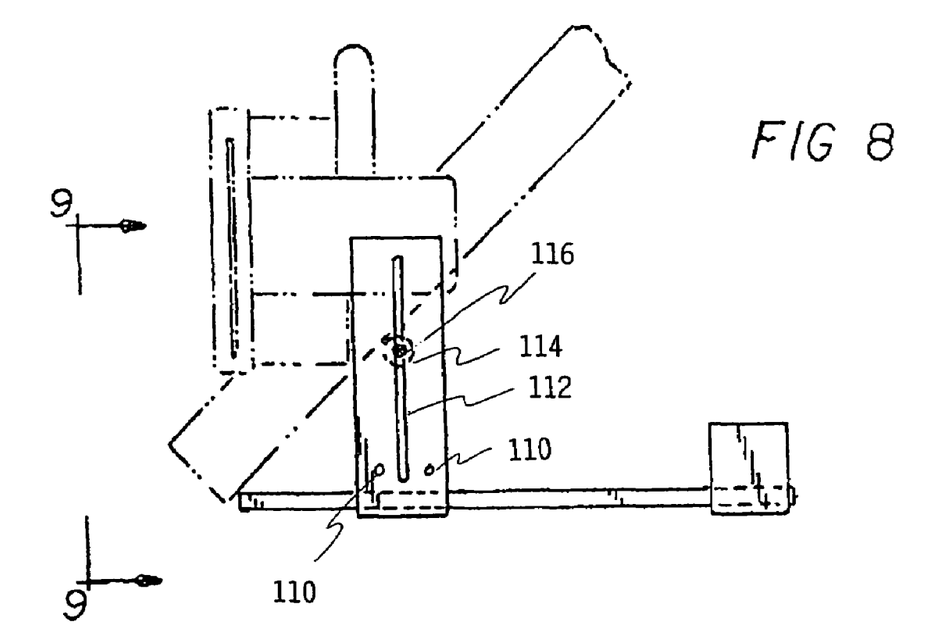
FIG. 8 is a top plan view of an alternate embodiment of the invention.
Figure 9:
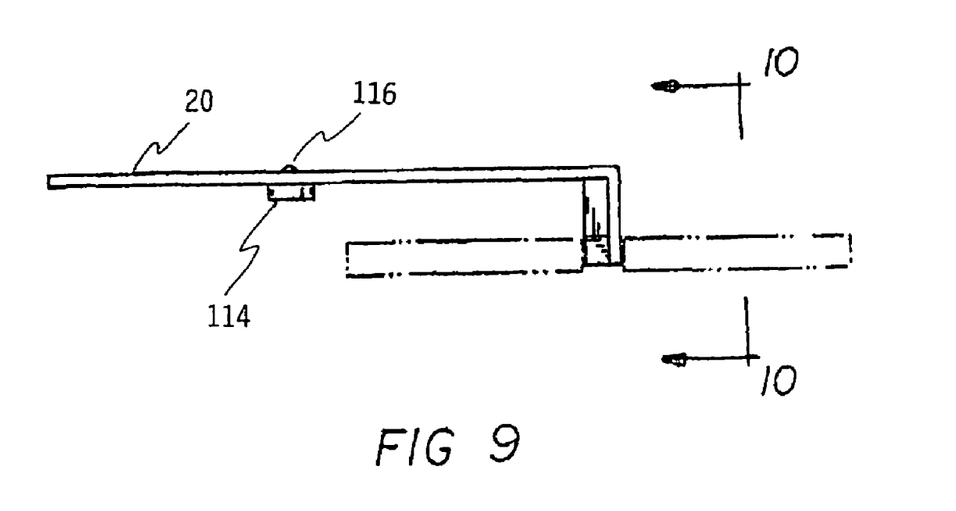
FIG. 9 is a side elevational view taken along line 9-9 of FIG. 8.
Figure 10:
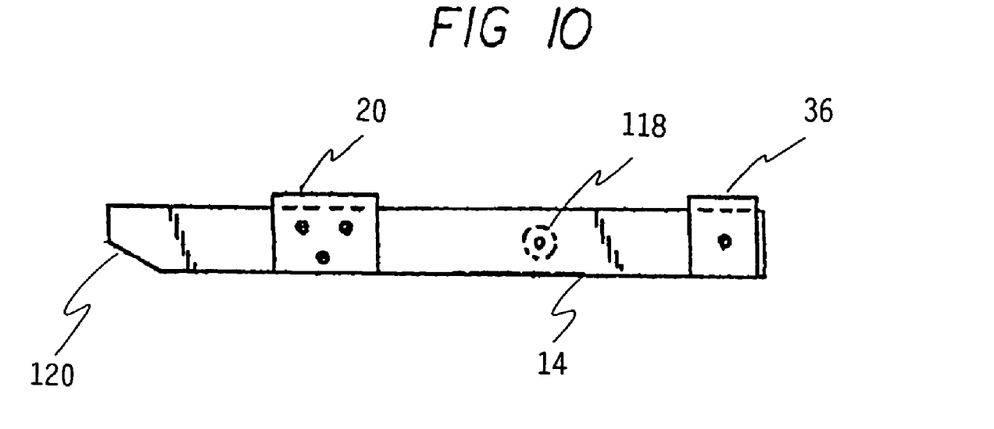
FIG. 10 is an end elevational view taken along line 10-10 of FIG. 9.
Figure 11:
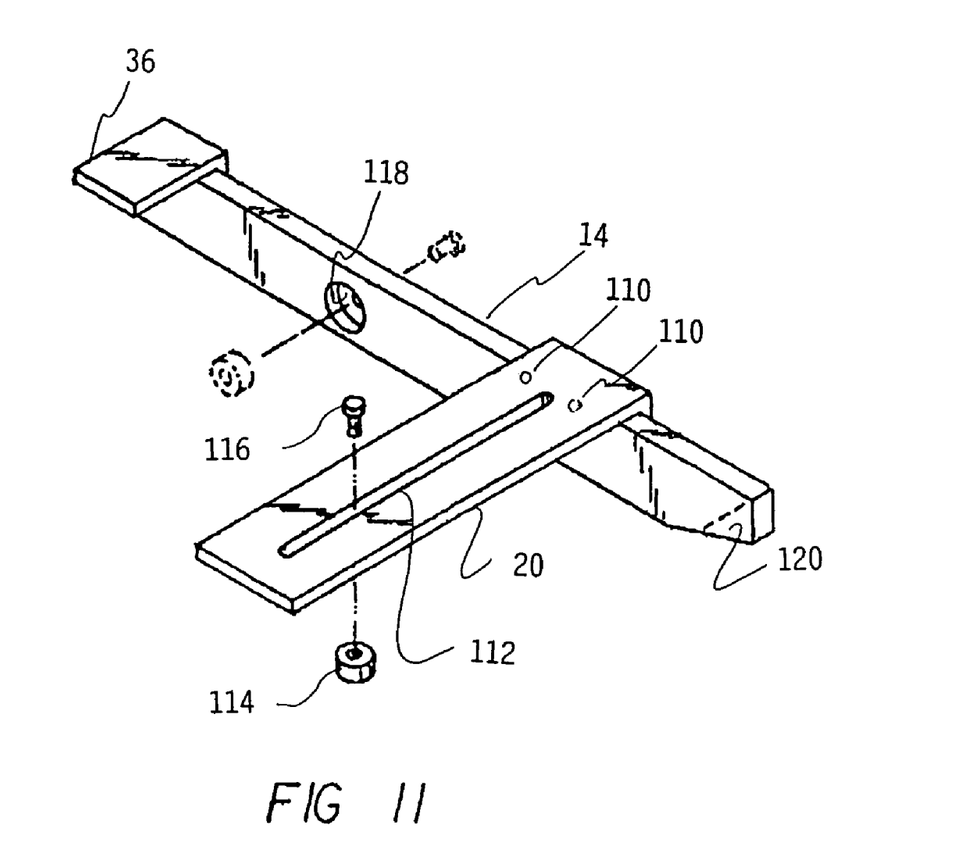
FIG. 11 is an exploded perspective view of the alternate embodiment of FIGS. 8-10.
Figure 12:
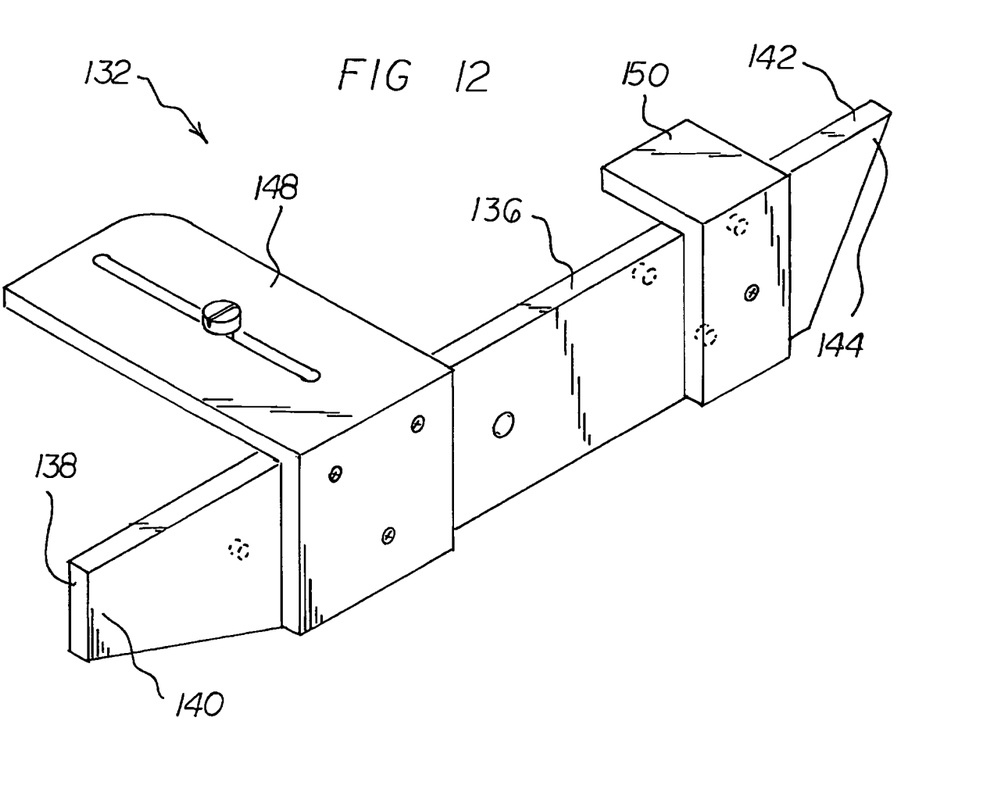
FIG. 12 is a perspective illustration of the final alternate embodiment of the invention.

The button is used for miter and compound cuts where the lumber is positioned at an angle to the stop piece as shown in FIG. 8. The button could be made from a variety of materials and a variety of production processes could be used to produce it, e.g., a plastic molding with a threaded metal insert or a hexagonal recess for a standard nut, an alloy die-casting, or a machined component made from steel bar. The button is 1" in diameter, 1/4" thick, and is threaded for a securing screw. When not in use, the button is stored in a circular recess in the stop piece, which is visible in FIGS. 14 and 15.

For the initial set up, every circular saw is different, so the system is designed to be customized for use with one saw only. The cutting guide is positioned on the stop piece so that the saw will trim about 1/16 inch off the end of the stop piece on the first cut. This forms an accurate cut line indicator for all future use with that saw. Countersunk wood screws are used to attach the support bracket and cutting guide to the stop piece, so that they can be removed and replaced without affecting the accuracy of the system.

For bevel and compound cuts, the system is reassembled as described above with the stop piece reversed. Note FIGS. 14 and 15. The angled cut line indicator can then be trimmed with the saw.

The invention works with a portable workbench to hold the lumber securely during the cut. The lumber is positioned, cut and removed without adjusting the workbench vise. It produces fast, accurate cross cuts to length and square, as well as miter, bevel and compound cuts. Both hands are left free to control the saw which is a big safety bonus. It does not reduce the capacity of the saw. Setup and adjustment are quick and easy for different lumber sizes. It is more effective and less expensive than competing products.

To cut miters, position the lumber at the desired angle, touching the cut line indicator. Loosely attach the button under the slot in the cutting guide. Slide the button until it touches the lumber, then tighten the screw. If a small angle is being cut, the button is attached at the opposite side of the lumber.

To cut bevels, release the system from the vise jaws. Remove the cutting guide and support bracket, turn the stop piece around and reassemble. Remove and store the button and its securing screw. Set up the system again in the vise. Adjust the saw as required.

To make compound cuts, set up the system for bevel cuts as detailed above. Position the lumber at the desired angle, touching the angled cut line indicator. Loosely attach the button under the slot in the cutting guide. Slide the button until it touches the lumber, then tighten the securing screw.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed is:

1. A workbench holder system for the cross cuts of lumber with an electric hand circular saw and portable workbench comprising, in combination:

a stop piece having a height and a thickness and a length in a generally rectilinear configuration with a first end having a first angled cut at an obtuse angle and with a second end having a second angled cut at an acute angle;

a cutting guide and a support bracket each having an inverted L-shaped configuration and each having an elongated horizontal component with an upper surface and a lower surface and a downwardly extending vertical component, the cutting guide having a slot through the horizontal component and a plurality of apertures through the vertical component with a plurality of screws coupling the cutting guide to the stop piece and with the lower surface of the horizontal component in contact with the upper surface of the stop piece and the cutting guide spaced a short distance from the first end thereof;

the support bracket being in an inverted L-shaped configuration having an elongated horizontal component with an upper surface and a lower surface and of a length shorter than the horizontal component of the cutting guide and a downwardly extending vertical component, the support bracket having an aperture through the vertical component thereof with a screw coupling the support bracket to the stop piece with the lower surface of the horizontal component in contact with the upper surface of the stop piece and the support bracket spaced a short distance from the second end thereof; and the stop piece and the vertical components of the cutting guide and support bracket all having downwardly extending portions adapted to be secured in a portable workbench vise whereby a generally rectilinear piece of lumber may be brought into contact with the stop piece remote from the vertical components of the cutting guide and the support bracket and beneath the lower surfaces of the horizontal components of the cutting guide and the support bracket for the accurate cross cutting and angle cutting of lumber.

* * * * *